G. H. BAKER.
MEASURING INSTRUMENT.
APPLICATION FILED MAY 6, 1916.
1,237,603.
Patented Aug. 21, 1917.
2 SHEETS—SHEET 1.
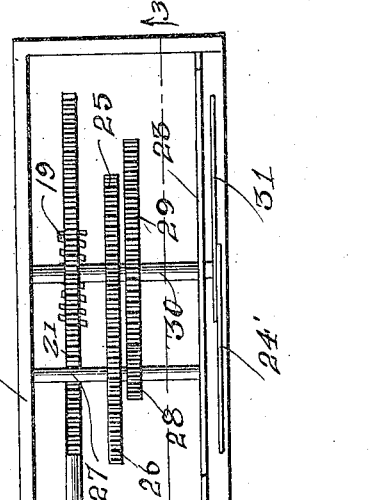
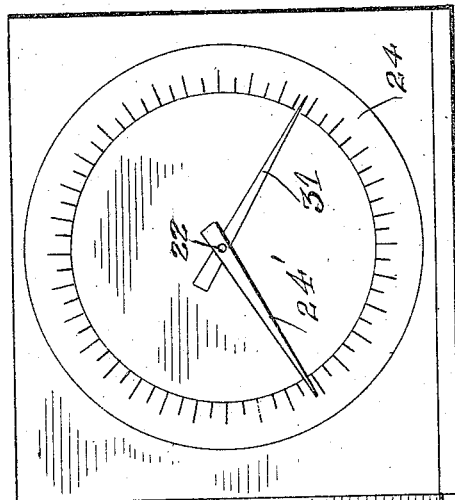
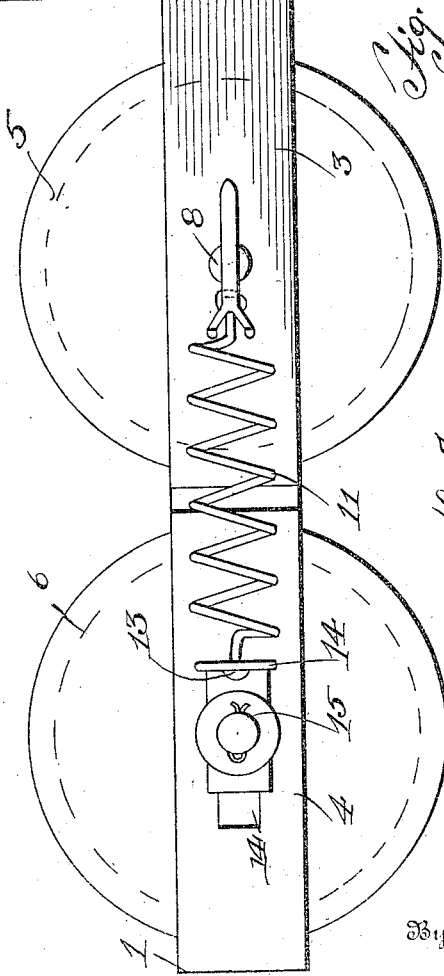
Gayle H. Baker
Inventor
By Geo. P. Kimmel
Attorney

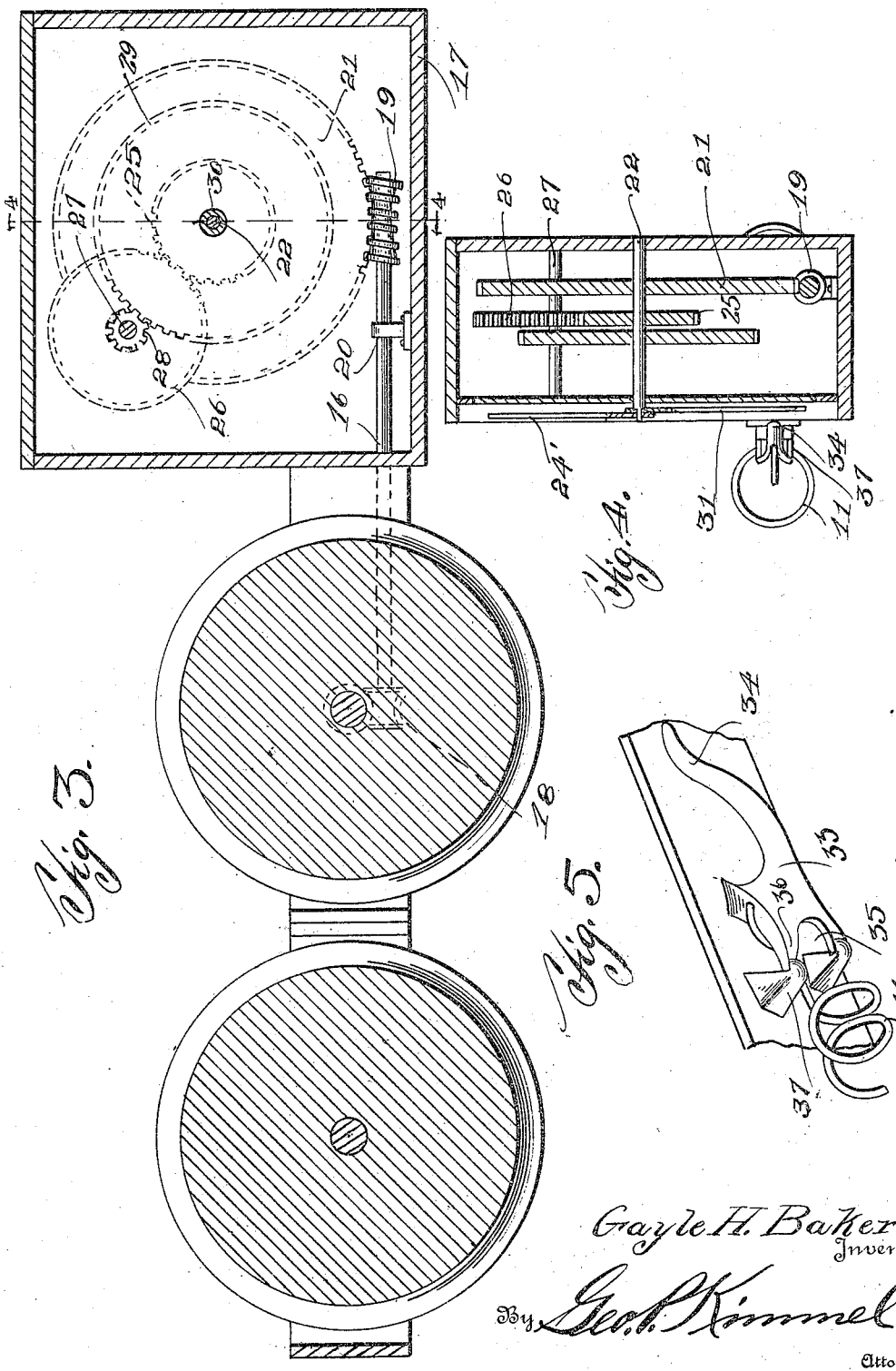

UNITED STATES PATENT OFFICE.

GAYLE H. BAKER, OF SHAMROCK, OKLAHOMA.

MEASURING INSTRUMENT.

1,237,603.  Specification of Letters Patent.  Patented Aug. 21, 1917.

Application filed May 6, 1916. Serial No. 95,964.

*To all whom it may concern:*

Be it known that I, GAYLE H. BAKER, a citizen of the United States, and resident of Shamrock, in the county of Creek and State of Oklahoma, have invented certain new and useful Improvements in Measuring Instruments, of which the following is a specification.

The present invention relates to new and useful improvements in measuring devices and has particular reference to an improved type of depth measuring device for wells and the like.

The primary object of my invention is to provide a well measuring device of the class described which may be quickly and easily attached to the "bailer" rope of the well pumping mechanism whereby to indicate the depth of the well. At the present time in measuring the depth of oil wells and the like it is necessary that pumping operation cease for a considerable time while the measuring process is being carried on. Not only this, but the depth measuring devices now employed are cumbersome and inefficient as well as inaccurate in many cases. It is therefore, a further object of my invention to provide a simple and lightly, yet durably constructed measuring device which may be attached to the bailer rope or pump rod as the case may be to indicate the amount of cable or rope which is "paid" out by the operator.

A still further object of my invention is to provide a measuring device of the class described having improved means for fastening the same in operative engagement with a cable or rope, the motion of the rope being transmitted to the measuring mechanism by friction.

A still further object of my invention is to provide improved means for maintaining the guiding means in engagement with such rope.

Of course, I do not limit myself to the use of the device as a well measuring article, in view of the fact that the same, without material modifications, may be used in various capacities.

Other objects and advantages to be derived from the use of my improved depth measuring device will appear from the following detail description and the claims, taken in connection with the accompanying drawings, in which Figure 1 is a side elevational view of a measuring device embodying the improvements of my invention;

Fig. 2 is a top plan view of the same a portion thereof being broken away and in section;

Fig. 3 is a longitudinal sectional view taken on the line 3—3 of Fig. 2 looking in the direction of the arrows;

Fig. 4 is a vertical sectional view taken through the measuring member of my invention on the line 4—4 of Fig. 3; and Fig. 5 is an enlarged fragmentary perspective view of an improved fastening means which I employ in connection with my invention.

Referring more particularly to the drawings, wherein similar characters of reference designate like and corresponding parts throughout the various views, I have provided a frame composed of two hingedly connected sections 1 and 2, said sections being formed of spaced parallel portions 3 and 4, respectively, in which are journaled power receiving friction wheels 5 and 6. The sections 1 and 2 of the frame mentioned are connected hingedly as at 7. The wheel 5 is mounted upon and rotatable with a shaft 8 on the free end of which is mounted a worm 9 for a purpose which will hereinafter appear.

I provide means for maintaining the wheels 5 and 6 in frictional engagement with a rope or other element the length of which is to be determined, said means comprising a pair of coiled springs 10 and 11 arranged on opposite sides of the frame. The spring 10 is permanently fastened in the bracket 12 carried by the sections 1 and 2 as best shown in Fig. 2, and provides means for retaining the sections in open position when the lever 33 has released the spring 11. The spring 11 is permanently fastened at 13 to a bracket 14 carried by the section 2, the free end of the spring being retained in detachable connection with the section 1 by means of an improved fastener which is described in detail hereinafter. The spring 11 retains the sections in closed position.

A suitable removable shaft 15 serves to carry the wheel 6, which is normally held in close proximity to wheel 5 by the tension of the springs 10 and 11. The measuring means of my invention includes a motion receiving shaft 16 arranged with one free end thereof within the housing 17 and the other free end thereof adjacent the worm 9, the latter mentioned free end having a worm gear 18 thereon, for meshing engagement with the worm 9. The inner free end of said shaft 16 is provided with a worm 19 the intermediate portion of said shaft being mounted in a bearing 20. The worm 19 is arranged in meshing engagement with a relatively large worm gear 21 mounted on a transversely arranged shaft 22 carried in the housing 17. The shaft 22 extends through the casing, one face 23 of said casing being provided with a dial 24 over which is movable an indicating hand 24' carried by said shaft 22. A gear 25 mounted on the shaft 22 meshes with a relatively larger gear 26 carried on a supplemental shaft 27, a pinion 28 mounted on said shaft meshing with a relatively large gear 29 carried by a hollow shaft 30 through which said shaft 22 operates. On the free end of the hollow shaft 30 I provide a second indicating hand 31 coöperating with the first mentioned indicating hand. One of the hands is adapted to indicate in tens and the other hand in hundreds or some similar relationship.

The fastening means referred to previously for connecting the spring 11 to the section 1 of the frame comprises a lever 33 carried by the free end of said spring 11, said lever having a finger engaging portion 34 and bifurcated as at 35 to provide spaced arms 36 for engagement with spaced extensions 37 formed on one of the sides 3 of the section 1 of the frame. In use the member 33 is adapted to be engaged behind the extensions 37 retaining the spring in connection with the section 1 for a purpose which will hereinafter appear.

In operation the hinged sections 1 and 2 are opened in order to embrace a cable or the like, said cable being arranged between the wheels 5 and 6. The fastening member 33 is connected with the section 1 and this maintains the springs under tension. Such tension brings the friction wheels 5 and 6 into snug engagement with the cable or rope and any movement of the cable or rope will therefore be imparted to said wheels. Such motion is transmitted to the registering mechanism contained in the housing 17 by virtue of the worm 9 and worm gear 18.

It will thus be seen that by attaching my improved measuring device to a well pumping cable or the like the exact length paid out by the operator may be accurately and quickly determined.

Of course, it will be readily apparent that the device of my invention may be applied to different uses and therefore, need not be used wholly in connection with measuring the depth of wells or the like.

From the above description taken in connection with the accompanying drawing, it is thought that a clear and comprehensive understanding of the construction, operation and advantages of my invention may be had, and while I have shown and described my invention as embodying a specific structure, I desire that it be understood that I may make such changes in said structure as do not depart from the spirit and scope of the invention as claimed.

Having thus fully described my invention, what I claim as new and desire to secure by Letters Patent, is:—

1. A measuring instrument of the class described, including hingedly connected frame sections, a registering mechanism, a housing for said mechanism carried by one of said sections, friction wheels carried by said frame sections, means for transmitting the motion of one of said wheels to said registering mechanism, spring means for maintaining said frame sections in open position, spring means for connecting said sections to hold them in closed position when applied, and a shaft member for one of said wheels slidably mounted on one of the said sections to provide means for operating the device with ropes of various sizes.

2. A device of the class described, including the combination of hingedly connected frame sections, a housing carried by one of said sections, a registering mechanism in said housing, pulley wheels mounted in said sections for engagement with an object passing therebetween, spring means for maintaining said sections in open position when released, means for maintaining said sections in closed position, said last named means including a spring having one end thereof connected with one of the sections, extensions carried by the other section, and means carried by the free end of said spring for engagement with said extensions, and a shaft member slidably mounted in one of the said sections to provide means for operating the device with ropes of various sizes.

3. A device of the class described, including the combination of hingedly connected frame sections, a housing carried by one of said sections, a registering mechanism in said housing, pulley wheels mounted on removable shaft members in said sections, brackets mounted on the shaft of one of said sections, one of said shafts being slidably mounted in one of the said sections to provide means for operating the device with ropes of various sizes and on the hingedly connected side of the sections, spring means for maintaining said sections in open position when released, a spring for maintaining said sections in closed position, one end of said spring being attached to one of said brackets, extensions carried by the other section, and means carried by the free end of said spring for engagement with the said extension.

4. A device of the class described, including the combination of hingedly connected frame sections, a housing carried by one of said sections, a register mechanism in said housing, pulley wheels mounted on said sections for engagement with an object placed therebetween, one of said wheels operating said register mechanism, spring means for maintaining said sections in open position when released, means for maintaining said sections in closed position, said means including a spring having one end thereof connected with one of the sections, extensions carried by the other section, fastening means for the free end of said spring, including a lever attached to the said free end of the spring, said lever having one end thereof bifurcated to form arms for engagement with the said extensions, and a shaft member slidably mounted in one of the said sections to provide means for operating the device with ropes of various sizes.

In testimony whereof, I affix my signature hereto.

GAYLE H. BAKER.

Copies of this patent may be obtained for five cents each, by addressing the "Commissioner of Patents, Washington, D. C."